(No Model.)
J. Y. COOPER.
SHEET METAL PIPE JOINT.
No. 266,017. Patented Oct. 17, 1882.
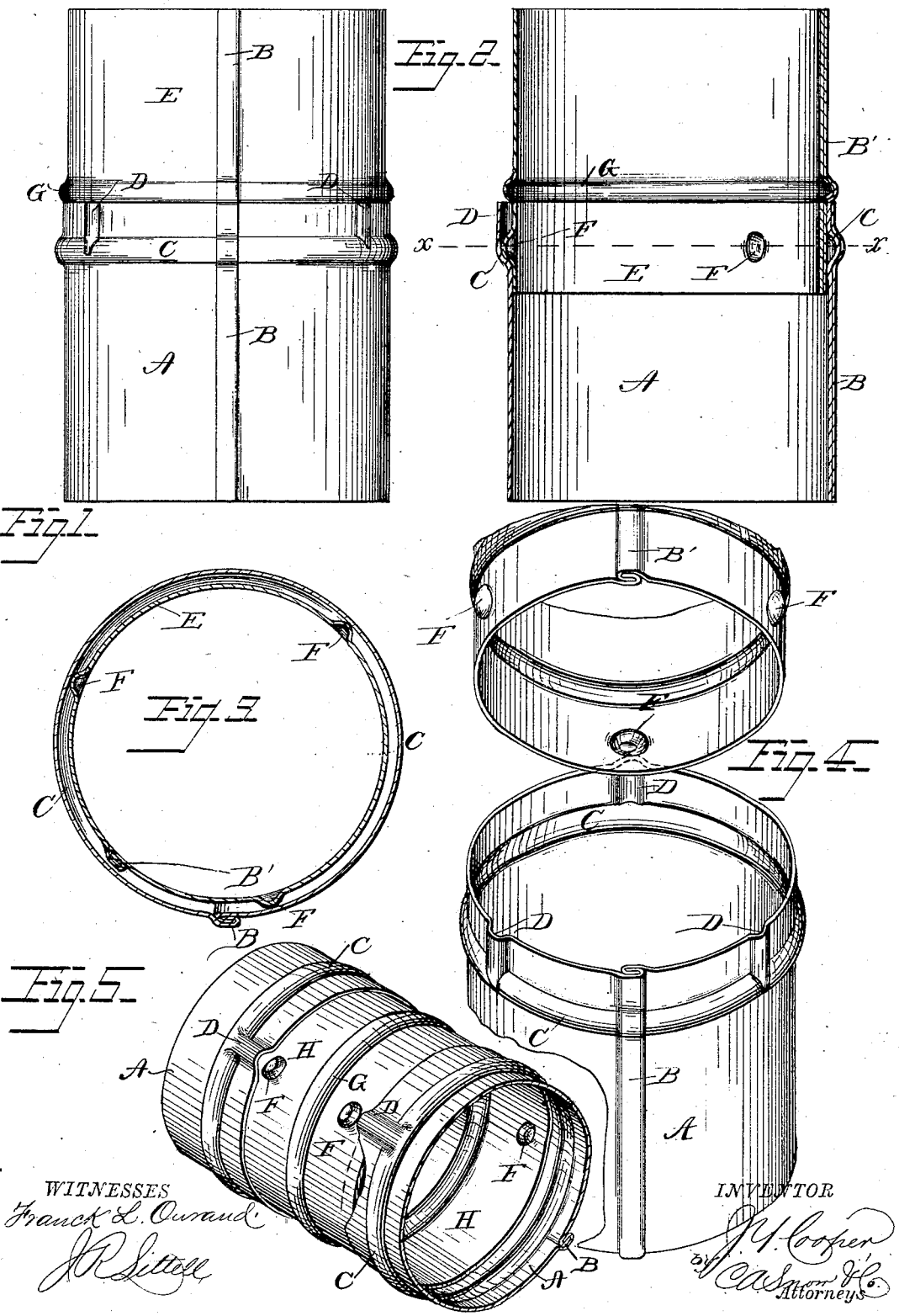

UNITED STATES PATENT OFFICE.

JOHN Y. COOPER, OF NASHVILLE, TENNESSEE.

SHEET-METAL-PIPE JOINT.

SPECIFICATION forming part of Letters Patent No. 266,017, dated October 17, 1882.

Application filed August 11, 1882. (No model.)

*To all whom it may concern:*

Be it known that I, JOHN Y. COOPER, of Nashville, in the county of Davidson and State of Tennessee, have invented certain new and useful Improvements in Sheet-Metal-Pipe Joints; and I do hereby declare that the following is a full, clear, and exact description of the invention, which will enable others skilled in the art to which it appertains to make and use the same, reference being had to the accompanying drawings, which form a part of this specification.

This invention relates to sheet-metal-pipe joints, and has for its object to provide simple, inexpensive, efficient, and convenient means for connection.

In the drawings, Figure 1 is a side view of a pipe-joint embodying my improvements; Fig. 2, a vertical sectional view; Fig. 3, a horizontal sectional view on the line $x\,x$, Fig. 2; Fig. 4, a perspective view of the parts detached; Fig. 5, a perspective view, illustrating a modification.

Referring to the drawings, A designates the end of a stove-pipe, rain-spout, or the like, having the usual seam, B, and an annular corrugation or groove, C, near its edge, into which groove opens two or more auxiliary grooves, D, extending from the edge of the pipe. E designates the end of the adjoining pipe, which is likewise provided with the seam B', and with two or more projections, F, near its edge, which tally with and are adapted to enter the grooves D. The projections F are preferably formed by stamping up the metal of the pipe, and are so arranged as to tally with grooves D when the seams B and B' are in line. Thus the seams form a guide-line to tell when the hidden locking devices tally in separating the pipes. Pipe E may be also provided with an annular groove or projection, G, which will serve as a guide-line when the projections F have reached groove C.

The operation and advantages of my invention will be readily understood. To connect the two pieces of pipe they are first placed together with the seams in line, when the section E can be forced into section A, the projections F on the former entering grooves D till they reach annular groove C. Either of the sections may then be turned to the right or left, so that the projections F will run in corrugation C, and thus lock the parts together. In uncoupling, the sections have only to be turned till their seams tally, when they can be readily separated.

In the modification shown in Fig. 5 the sections of pipe having grooves C and D are shown connected by a separate joint, H, having a central guide corrugation or projection, G, against which the edges of the pipe will abut, and provided with projections F on each side groove G. In some cases this is a preferable mode of connection.

I am aware of Patents No. 63,797, to Hurd, and No. 177,729, to Loring, the former of which shows a pipe provided with grooves and entering projections, and the latter a pipe with curved slots to be entered by pins. I claim broadly nothing shown in these patents, my claim being limited to my own improved construction and arrangement of parts.

I claim as new—

As an improvement in sheet-metal-pipe joints, the combination of two sections of pipe, one provided with a groove to receive projections on the other pipe, which projections will be entirely hidden from view when the pipes are adjusted together, and will lock the pipes from disengagement by force exerted longitudinally in either direction, said sections of pipe each having a seam arranged to tally with the seam of the adjoining section when the entirely-hidden projections are at the point where they can be separated from the grooves, the sections being capable of complete revolution on each other to bring said seams together, all arranged and operating substantially as shown and specified.

In testimony that I claim the foregoing as my own I have hereto affixed my signature in presence of two witnesses.

JOHN YOUNG COOPER.

Witnesses:
WM. L. MANEE,
STOKELY BLACK.